United States Patent [19]

Ostermayer et al.

[11] Patent Number: 4,948,832

[45] Date of Patent: Aug. 14, 1990

[54] REINFORCED THERMOPLASTIC MOLDING MATERIALS BASED ON POLYPHENYLENE ETHER

[75] Inventors: Bertram Ostermayer; Ehrenfried Baumgartner; Rainer Bueschl, all of Roedersheim-Gronau; Hermann Brandt, Schifferstadt; Klaus Boehlke, Hessheim; Erhard Seiler, Ludwigshafen; Graham E. McKee, Weinheim, all of Fed. Rep. of Germany

[73] Assignee: BASF Aktiengesellschaft, Ludwigshafen, Fed. Rep. of Germany

[21] Appl. No.: 281,755

[22] Filed: Dec. 9, 1988

[30] Foreign Application Priority Data

Dec. 9, 1987 [DE] Fed. Rep. of Germany ....... 3741670

[51] Int. Cl.$^5$ .................. C08L 71/12; C08L 43/04
[52] U.S. Cl. .................. 524/504; 524/505; 524/508; 525/68; 525/93; 525/94; 525/132; 525/152
[58] Field of Search ............. 524/508, 505, 504; 525/68, 93, 94, 132, 152

[56] References Cited

U.S. PATENT DOCUMENTS

| | | |
|---|---|---|
| 4,242,254 | 12/1980 | Abolins . |
| 4,311,633 | 1/1982 | Lee, Jr. . |
| 4,414,342 | 11/1983 | Falk .................................. 523/437 |

FOREIGN PATENT DOCUMENTS

| | | | |
|---|---|---|---|
| 176896 | 4/1986 | European Pat. Off. . | |
| 3434979 | 4/1986 | Fed. Rep. of Germany ...... | 524/508 |
| 1305685 | 2/1973 | United Kingdom ............... | 524/508 |

Primary Examiner—C. Warren Ivy
Attorney, Agent, or Firm—Oblon, Spivak, McClelland, Maier & Neustadt

[57] ABSTRACT

Reinforced thermoplastic molding materials containing, as essential components, (A) from 40 to 94 parts by weight of a polymer component of
  (a$_1$) from 10 to 90% by weight of polyphenylene ether and
  (a$_2$) from 10 to 90% by weight, based in each case on A, of a styrene polymer toughened with an acrylate rubber or with an unhydrogenated or hydrogenated polymer of a conjugated diene,
(B) from 1 to 20 parts by weight of a copolymer of
  (b$_1$) from 70 to 99.9% by weight of a monomer from the group consisting of styrene, α-methylstyrene and styrene alkylated in the nucleus or a mixture of these monomers,
  (b$_2$) from 0.1 to 30% by weight of one or more compounds from the group consisting of tert-butyl acrylate and tert-butyl methacrylate, or one or more compounds from the group of compounds of the general formula I

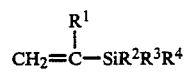

where R$^1$ is hydrogen or methyl and R$^2$, R$^3$ and R$^4$ are each an alkyl or alkoxy group of not more than 4 carbon atoms, or of the general formula II

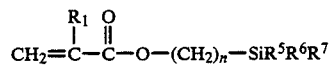

where n is an integer from 1 to 4 and R$^5$, R$^6$ and R$^7$ are each one of the radicals stated for R$^2$ or are each —O(CH$_2$—CH$_2$—O)$_m$R$^8$, where R$^8$ is C$_1$–C$_4$-alkyl and m is 1, 2, 3 or 4, and
  (b$_3$) from 0 to 10% by weight, based on the copolymer, of a further ethylenically unsaturated monomer which is copolymerizable with b$_1$ and b$_2$, and
(C) from 5 to 50 parts by weight of a reinforcing agent, the number of parts by weight being based on 100 parts by weight of the sum of A, B and C, are prepared and used for the production of moldings.

10 Claims, No Drawings

REINFORCED THERMOPLASTIC MOLDING MATERIALS BASED ON POLYPHENYLENE ETHER

The present invention relates to reinforced thermoplastic molding materials containing, as essential components, (A) from 40 to 94 parts by weight of a polymer component of
  ($a_1$) from 10 to 90% by weight of polyphenylene ether and
  ($a_2$) from 10 to 90% by weight, based in each case on A, of a styrene polymer toughened with an acrylate rubber or with an unhydrogenated or hydrogenated polymer of a conjugated diene, (B) from 1 to 20 parts by weight of a copolymer of
  ($b_1$) from 70 to 99.9% by weight of a monomer from the group consisting of styrene, α-methylstyrene and styrene alkylated in the nucleus or a mixture of these monomers,
  ($b_2$) from 0.1 to 30% by weight of one or more compounds from the group consisting of tert-butyl acrylate and tert-butyl methacrylate, or one or more compounds from the group of compounds of the general formula I

where $R^1$ is hydrogen or methyl and $R^2$, $R^3$ and $R^4$ are each an alkyl or alkoxy group of not more than 4 carbon atoms, or of the general formula II

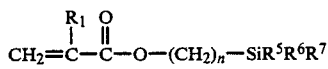

where n is an integer from 1 to 4 and $R^5$, $R^6$ and $R^7$ are each one of the radicals stated for $R^2$ or are each $-O(CH_2-CH_2-O)_m R^8$, where $R^8$ is $C_1$-$C_4$-alkyl and m is 1, 2, 3 or 4, and
  ($b_3$) from 0 to 10% by weight, based on the copolymer, of a further ethylenically unsaturated monomer which is copolymerizable with $b_1$ and $b_2$, and (C) from 5 to 50 parts by weight of a reinforcing agent, the number of parts by weight being based on 100 parts by weight of the sum of A, B and C.

Polymer blends of polyphenylene ethers (PPE) and styrene polymers, which may contain reinforcing agents, are known per se.

For example, DE-A-No. 31 18 629 describes the mixing of PPE with toughened styrene polymers having a certain composition and silicone oils to improve the flow properties. When these molding materials are reinforced, the rigidity is still unsatisfactory.

U.S. Pat. No. 4,242,254 discloses glass fiber-reinforced molding materials which have improved flame-proofing properties owing to pretreatment of the fibers. However, their impact strength is unsatisfactory.

Blends of PPE with styrene/acrylate copolymers (DE-A No. 33 46 302) and blends of PPE with styrene/n-butyl acrylate copolymers and polystyrene, modified with a polymer of ethylene/propylene with a non-conjugated diene (EPDM polymer) (U.S. Pat. No. 4,311,633) have also been described. However, if such molding materials are reinforced, the impact strength and tensile strength are unsatisfactory.

Molding materials according to EP-A No. 81 230, which contain glass fibers and a copolymer of styrene and maleic anhydride, glycidyl methacrylate or certain acrylamides, possess adequate heat distortion resistance. The tensile strength and the rigidity are unsatisfactory, particularly when they are colored with pigments.

It is an object of the present invention to provide reinforced molding materials which are based on polyphenylene ethers and have well-balanced mechanical properties, such as high rigidity and tensile strength as well as improved toughness, even when they contain pigments.

We have found that this object is achieved by the molding materials defined at the outset.

Specific embodiments of the molding materials according to the subclaims, a preparation process and the use of the molding materials for the production of moldings have also been found.

The novel molding materials contain, as essential components, from 40 to 94, preferably from 50 to 88, parts by weight of A, from 1 to 20, preferably from 2 to 10, parts by weight of B and from 5 to 50, preferably from 10 to 48, parts by weight of C, the number of parts by weight being based on 100 parts by weight of the sum of A, B and C. Preferably, the molding materials consist of these components.

Polymer component A consists of from 10 to 90, preferably from 20 to 80, in particular from 30 to 80, % by weight of polyphenylene ether $a_1$ and from 10 to 90, preferably from 20 to 80, in particular from 20 to 70, % by weight, based on component A, of a toughened styrene polymer $a_2$.

The suitable polyphenylene ethers $a_1$ are known per se and are prepared by oxidative coupling by a conventional process from a phenol which is disubstituted in the ortho position by alkyl, alkoxy, chlorine or bromine (cf. U.S. Pat. Nos. 3,661,848, 3,378,505, 3,306,874, 3,306,875 and 3,639,656). The alkyl or alkoxy groups, which are preferably of 1 to 4 carbon atoms but do not contain an α tertiary hydrogen atom can in turn be substituted by chlorine or bromine. Examples of suitable polyphenylene ethers are poly-2,6-diethyl-1,4-phenylene ether, poly-2-methyl-6-ethyl-1,4-phenylene ether, poly-2-methyl-6-propyl-1,4-phenylene ether, poly-2,6-dipropyl-1,4-phenylene ether, poly-2-ethyl-6-propyl-1,4-phenylene ether, poly-2,6-dichloro-1,4-phenylene ether and poly-2,6-dibromo-1,4-phenylene ether, and copolymers such as those which contain 2,3,6-trimethylphenol, as well as polymer blends. Poly-2,6-dimethyl-1,4-phenylene ether is preferred. The polyphenylene ethers generally have a relative viscosity of from 0.3 to 0.7 dl/g, measured in 1% strength by weight solution in chloroform at 25° C.

Conventional styrene polymers which differ from component B and are toughened in a certain manner are used as $a_2$.

Suitable styrene polymers are all conventional homopolymers and copolymers of styrene. The weight average molecular weights $M_w$ of the commonly used styrene polymers are from 150,000 to 300,000. Suitable styrene polymers are prepared by the known mass, solution or suspension polymerization methods, predominantly from styrene and also from styrenes substituted in the nucleus or side chain by $C_1$-$C_4$-alkyl, such as α-methylstyrene or p-methylstyrene (cf. Ullmanns Encyclopaädie der Technischen Chemie, Volume 19, pages 265-272, Verlag Chemie, Weinheim 1980).

Toughening can be effected by admixing small amounts, preferably from 2 to 20% by weight, based on the styrene polymer, of an acrylate rubber or of a polymer of a conjugated diene, such as butadiene or isoprene. The diene polymers can be partially or completely hydrogenated. The rubber or the diene polymer should have a glass transition temperature of less than 0° C., measured according to K. H. Illers and H. Breuer, Kolloid Zeitschrift 176 (1961), 110. Conventional rubbers are suitable, such as polybutadiene rubber, acrylate rubber, styrene/butadiene rubber, hydrogenated styrene/butadiene rubber, acrylonitrile/butadiene rubber, polyisoprene rubber, ionomers, styrene/butadiene block copolymers, including AB, ABA and ABAB tapered block copolymers, star block copolymers and the like, similar isoprene block copolymers and in particular (partially) hydrogenated block copolymers, as disclosed in EP-A No. 62 283. Synthetic rubbers of this type are familiar to the skilled worker and are summarized, together with the unsuitable EPDM rubbers, in Ullmanns Encyklopädie der technischen Chemie, 4th Edition, Volume 13, pages 595-634, Verlag Chemie GmbH, 1977.

Toughening can be effected in a preferred manner also by preparing the styrene polymers in the presence of fairly small amounts, for example from 2 to 20% by weight, based on the styrene polymer, of a rubber-like polymer based on a conjugated diene, and, if required, also of an acrylate rubber (HIPS). Rubber-like polymers based on butadiene, for example styrene/butadiene polymers, polybutadiene and butadiene/styrene block copolymers, are suitable.

These styrene polymers toughened in a certain manner are sufficiently familiar to the skilled worker from the literature and in practice for further description to be unnecessary here (cf. Ullmanns Encyklopadie der technischen Chemie, 4th Edition, Volume 19, pages 272-295, Verlag Chemie GmbH, 1980).

The copolymer B consists of from 70 to 99.9, preferably from 80 to 99.5, in particular from 85 to 97, % by weight of $b_1$, from 0.1 to 30, preferably from 0.5 to 20, in particular from 3 to 15, % by weight of $b_2$ and from 0 to 10% by weight, in each case based on the copolymer, of $b_3$. $b_3$ is preferably absent.

In particular styrene, but also α-methylstyrene or styrene alkylated in the usual manner with $C_1$-$C_4$-alkyl in the aromatic nucleus, such as p-methylstyrene, or a mixture of such monomers can be used as $b_1$.

Tert-butyl acrylate and/or tert-butyl methacrylate can be used as $b_2$. A compound of the general formula I

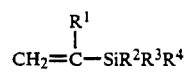

$$CH_2=\overset{R^1}{\underset{|}{C}}-SiR^2R^3R^4 \qquad I$$

where $R^1$ is hydrogen or methyl and $R^2$, $R^3$ and $R^4$ are each an alkyl or alkoxy group of not more than 4 carbon atoms, preferably methoxy or ethoxy, and/or a compound of the general formula II

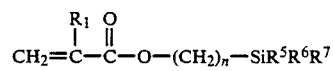

$$CH_2=\overset{R_1}{\underset{|}{C}}-\overset{O}{\underset{||}{C}}-O-(CH_2)_n-SiR^5R^6R^7 \qquad II$$

where n is an integer from 1 to 4, preferably 3, and $R^5$, $R^6$ and $R^7$ are each one of the radicals stated for $R^2$ and are preferably —O$(\!$—$CH_2$—$CH_2$—O$)\!_m R^8$, where m is 1, 2, 3 or 4, preferably 1, and $R^8$ is $C_1$-$C_4$-alkyl, preferably methyl or ethyl, are also suitable. Good results are obtained with vinyltriethoxysilane [$CH_2$=$CHSi(OC_2H_5)_3$], γ-meth-acryloyloxypropyl-trimethoxysilane [$CH_2$=$C(CH_3)$—COO—$CH_2CH_2$—$CH_2$—$Si(OCH_3)_3$] and γ-methacryloyloxypropyl-triethoxysilane [$CH_2$=$C(CH_3)$—COO—$CH_2CH_2CH_2$—$Si(OC_2H_5)_3$], vinyltrimethoxysilane [$CH_2$=$CHSi(OCH_3)_3$] and/or γ-methacryloyloxypropyltris-(2-methoxyethoxy)-silane [$CH_2$=$C(CH_3)$—COO—$CH_2CH_2CH_2$—$Si(OCH_2CH_2OCH_3)_3$]. Such compounds are commercially available, for example under the trade name Dynasil ® from Union Carbide.

Other suitable ethylenically unsaturated monomers which are copolymerizable with $b_1$ and $b_2$ are acrylic acid, methacrylic acid, acrylates or methacrylates, where the alcohol radical is of not more than 4 carbon atoms, maleic anhydride, (meth)acrylamide and maleimide.

Copolymer B generally has a viscosity number (VN) of from 0.3 to 1.5 dl/g, determined in dimethylformamide at 25° C. according to DIN 53,726.

Copolymer B can be prepared by emulsion polymerization or by continuous solution or mass copolymerization.

The copolymer containing tert-butyl (meth)acrylate is preferably prepared by emulsion polymerization.

The technique of emulsion polymerization is known per se and is described in
1. Ullmann's Encyklopaädie der technischen Chemie, Volume 19, 4th Edition, 1980, pages 132-145, and
2. Encyclopedia of Polymer Science and Engineering Second Edition, Volume 6, pages 1-51.

The solids contents employed are from 5 to 75, preferably from 10 to 65, % by volume. The polymerization initiators used are substances such as potassium persulfate, sodium persulfate, organic peroxides and azo compounds.

The emulsifiers used can be of the anionic, cationic or amphoteric type.

The silicon-containing copolymer is preferably prepared by continuous copolymerization. Such mass and solution polymerizations are generally known from Ullmann's Encyclopädie der technischen Chemie, Volume 19, 4th Edition, 1980, pages 107-120 or 265-268.

In the known continuous copolymerization, copolymer B is generally prepared at elevated temperatures and with vigorous stirring. The monomers are introduced continuously into a polymerization vessel and at the same time an amount of the polymerization mixture corresponding to these amounts is removed from the vessel (cf. A. W. Hanson and R. L. Zimmermann, Industrial Eng. Chemistry 49 (1957), 803).

The novel molding materials contain, as component C, conventional reinforcing materials, such as glass fibers, glass spheres, mineral fibers, whiskers, alumina fibers or mica. Glass fibers are particularly preferred.

The glass fibers may be of E, A or C glass, can be treated with a size consisting of an adhesion promoter and have a diameter of, in general, from 6 to 20 μm. Rovings as well as chopped glass strands having a length of from 1 to 10 mm, preferably from 3 to 6 mm, or short glass fibers having a length of from 0.05 to 1.5 mm can be used as component C.

In addition to the stated components, the novel molding materials may contain further substances D, such as conventional heat stabilizers and light stabilizers, lubricants and mold release agents, and colorants, such as dyes and pigments, in the usual amounts. Flameproofing agents, in particular phosphorus-containing flameproofing agents, such as alkyl phosphate and phosphine oxides, may also be mentioned. Good flame retardance is achieved with triphenyl phosphate and triphenylphosphine oxide. Furthermore, polymers other than those mentioned, for example polymers based on vinylaromatics or polyamides, may be added to the molding materials according to the invention.

The novel molding materials are usually prepared as described below:

Components A, B and, if required, D, generally in the melt, are mixed with the reinforcing agent at from 200° to 320° C., preferably from 250° to 300° C., in an extruder, roll mill or kneader during a residence time of from 0.5 to 10 minutes. However, it is also possible to prepare solutions of the components A, B and D or partial mixtures, for example A+B, and to mix these with D, then to devolatilize the solvents and to mix the mixtures with the reinforcing agent and thereafter, if required, with the additives and once again to carry out compounding. Components A, B and D are preferably mixed in the presence of, or with the addition of, the reinforcing agents C. It is also possible to premix some or all of component C with one or more other components, for example $a_2$.

The novel molding material is preferably prepared by the following method, particularly if a copolymer containing tert-butyl (meth)acrylate is used as component B:

Copolymer B, in an aqueous dispersion (prepared by emulsion polymerization or by secondary dispersion of the ready-prepared polymer in powder form in water with the aid of conventional emulsifiers and/or suspending agents), is added directly to the rovings or the latter are impregnated with the dispersion, and the dispersion together with the glass fibers are introduced into the extruder through an orifice in the latter and are combined with the melt of component A, the water present being evaporated or being stripped off under reduced pressure.

The novel molding materials are suitable for the production of all types of moldings, for example by injection molding or extrusion.

The molding materials and the moldings produced from them have advantageous mechanical and thermal properties. They possess high rigidity, good tensile strength and improved impact resistance, particularly when they have been colored with pigments.

EXAMPLES 1 TO 7 AND COMPARATIVE EXPERIMENTS 1* TO 11*

The following components were used for carrying out Examples and Comparative Experiments:

Component A
- $a_1$: Poly-2,6-dimethyl-1,4-phenylene ether having a relative viscosity of 0.55 dl/g, measured in chloroform at 25° C.
- $a_2$ (1): High impact polystyrene 576 H (BASF) containing 8% by weight of butadiene and having a melt flow index of 5.5 g/10 min, measured according to DIN 53,735 at 200° C. and under a load of 5 kg.
- $a_2$ (2): High impact polystyrene 2710 from BASF AG, containing 8% by weight of butadiene and having a melt flow index (200° C./5 kg) of 4 g/10 min.
- $a_2$ (3): High impact polystyrene 586 G from BASF AG, containing 10% by weight of butadiene and having a melt flow index (200° C./5 kg) of 4 g/10 min.
- $a_2$ (4): Polystyrene which has been prepared in the presence of 8% by weight of an EPDM polymer of 45% by weight of ethylene, 46% by weight of propylene, 7% by weight of 5-ethylidene-2-norbornene and 2% by weight of dicyclopentadiene, according to U.S. Pat. No. 4,311,633.

Component B
- B (1): Copolymer of 95% by weight of styrene and 5% by weight of tert-butyl acrylate, having a viscosity number of 1.0 dl/g.
- B (2): Copolymer of 90% by weight of styrene and 10% by weight of tert-butyl acrylate, having a viscosity number of 0.85 dl/g.

B (1) and B (2) were prepared as follows: Distilled water, the sodium salt of a $C_{12}$–$C_{18}$-paraffinsulfonic acid (emulsifier) and potassium persulfate as an initiator were heated to 80° C. in a reactor and flushed with nitrogen.

The monomers were introduced in the stated ratios in the course of 4 hours. In addition, the monomer mixture contained 0.37% by weight of dodecyl mercaptan as a regulator. Two hours after the end of the addition, the mixture was cooled.

The amount of emulsifier and potassium persulfate was 1.2 and 0.4% by weight in each case, based on the monomers. The final solids content of the dispersions was 39% by weight, and the pH was 4.5

- B (3): Copolymer of 96% by weight of styrene and 4% by weight of vinyltrimethoxysilane, having a viscosity number of 0.85 dl/g.
- B (4) Copolymer of 96% by weight of styrene and 4% by weight of γ-methacryloyloxypropyltrimethoxysilane (VN=0.95 dl/g).
- B (5) Copolymer of 95% by weight of styrene and 5% by weight of γ-methacryloyloxypropyltriethoxysilane (VN=0.78 dl/g).

The following copolymers were used for comparative purposes:
- B (V1) Copolymer of 85% by weight of styrene and 15% by weight of maleic anhydride (VN=0.93 dl/g).
- B (V2) Copolymer of 90% by weight of styrene and 10% by weight of glycidyl methacrylate (VN=0.85 dl/g).
- B (V3) Copolymer of 92% by weight of styrene and 8% by weight of n-butyl acrylate (VN=0.78 dl/g).

The copolymers B (3), B (4), B (5), B (V1), B (V2) and B (V3) were prepared as follows:

The monomer mixtures were polymerized by continuous solution polymerization with the addition of from 20 to 80 parts by weight of ethylbenzene per 100 parts by weight of the monomers, in the course of a residence time of from 4 to 8 hours at from 120° to 180° C. and under from 4 to 10 bar. From 0.1 to 2.0 parts by weight of tert-dodecyl mercaptan per 100 parts by weight of the monomers were used as a chain transfer agent, the tert-dodecyl mercaptan being metered in continuously during polymerization. The resulting copolymers were devolatilized via an extruder and obtained as granules.

Component C

C (1): Glass fibers OFC® R20 EX4 from Owens Corning Fiberglass Corp., fiber thickness 10 μm (roving).
C (2): Vitrofil® CP 715 from Montedison GmbH, fiber thickness 16 μm, fiber length 4.75 mm.

Additives

D (1): TiO$_2$, type FKD from Bayer AG
D (2): Triphenylphosphine oxide.

The components stated in Table 1 were melted with 0.8 kg of tris-(nonylphenyl) phosphite and 1.5 kg of polyethylene in a twin-screw extruder at 280° C., homogenized, mixed and granulated.

The parameters stated in Table 2 were determined on test specimens injection-molded at 280° C.: The impact strength according to DIN 53,453, the tensile strength according to DIN 53,455 and the modulus of elasticity according to DIN 53,457.

TABLE 1

| Example | Comp. Exp. | $a_1$ | $a_2$ Type | Amount | B Type | Amount | C Type | Amount | D Type | Amount |
|---|---|---|---|---|---|---|---|---|---|---|
| 1 |  | 35 | $a_2$(1) | 31 | B(1) | 3 | C(1) | 28 | D(1) | 3 |
|  | 1* | 35 | $a_2$(1) | 31 | B(V1) | 3 | C(1) | 28 | D(1) | 3 |
|  | 2* | 35 | $a_2$(1) | 34 |  |  | C(1) | 28 | D(1) | 3 |
| 2 |  | 21 | $a_2$(2) | 44 | B(2) | 5 | C(2) | 25 | D(1) | 5 |
|  | 3* | 21 | $a_2$(2) | 44 | B(V2) | 5 | C(2) | 25 | D(1) | 5 |
|  | 4* | 21 | $a_2$(2) | 49 |  |  | C(2) | 25 | D(1) | 5 |
| 3 |  | 51 | $a_2$(1) | 23 | B(2) | 4 | C(2) | 20 | D(1) | 2 |
|  | 5* | 51 | $a_2$(1) | 23 | B(V1) | 4 | C(2) | 20 | D(1) | 2 |
| 4 |  | 46 | $a_2$(1) | 16 | B(1) | 4 | C(1) | 30 | D(1) | 4 |
|  | 6* | 46 | $a_2$(4) | 16 | B(V3) | 4 | C(1) | 30 | D(1) | 4 |
| 5 |  | 26 | $a_2$(3) | 43 | B(3) | 5 | C(1) | 22 | D(2) | 4 |
|  | 7* | 26 | $a_2$(3) | 43 | B(V1) | 5 | C(1) | 22 | D(2) | 4 |
|  | 8* | 26 | $a_2$(3) | 48 |  |  | C(1) | 22 | D(2) | 4 |
| 6 |  | 42 | $a_2$(1) | 31 | B(4) | 4 | C(2) | 15 | D(1) | 3 |
|  |  |  |  |  |  |  |  |  | D(2) | 5 |
|  | 9* | 42 | $a_2$(1) | 31 | B(V2) | 4 | C(2) | 15 | D(1) | 3 |
|  |  |  |  |  |  |  |  |  | D(2) | 5 |
|  | 10* | 42 | $a_2$(1) | 35 |  |  | C(2) | 15 | D(1) | 3 |
|  |  |  |  |  |  |  |  |  | D(2) | 5 |
| 7 |  | 28 | $a_2$(1) | 38 | B(5) | 4 | C(2) | 28 | D(1) | 2 |
|  | 11* | 28 | $a_2$(1) | 38 | B(V2) | 4 | C(1) | 28 | D(1) | 2 |

TABLE 2

Properties of the molding materials

| Example | Comparative Experiment | Impact strength [kJ/m$^2$] | Modulus of elasticity [N/mm$^2$] | Tensile strength [N/mm$^2$] |
|---|---|---|---|---|
| 1 |  | 20 | 9200 | 140 |
|  | 1* | 16 | 8700 | 128 |
|  | 2* | 14 | 8500 | 120 |
| 2 |  | 16 | 8300 | 117 |
|  | 3* | 13 | 7750 | 110 |
|  | 4* | 11 | 7300 | 95 |
| 3 |  | 23 | 9600 | 145 |
|  | 5* | 21 | 8900 | 130 |
| 4 |  | 27 | 10100 | 142 |
|  | 6* | 14 | 8700 | 99 |
| 5 |  | 15 | 7300 | 105 |
|  | 7* | 13 | 6900 | 93 |
|  | 8* | 10 | 6050 | 77 |
| 6 |  | 26 | 7800 | 110 |
|  | 9* | 22 | 7400 | 102 |
|  | 10* | 17 | 7300 | 98 |
| 7 |  | 22 | 9300 | 129 |
|  | 11* | 18 | 8400 | 117 |

We claim:

1. A reinforced thermoplastic molding material containing, as essential components,
   (A) from 40 to 94 parts by weight of a polymer component of
   ($a_1$) from 10 to 90% by weight of polyphenylene ether and
   ($a_2$) from 10 to 90% by weight, based in each case on A, of a styrene polymer toughened with an acrylate rubber or with an unhydrogenated or hydrogenated polymer of a conjugated diene, with the proviso that the acrylate rubber differs from component (B) in having a glass transition temperature below 0° C.
   (B) from 1 to 20 parts by weight of a copolymer of
   ($b_1$) from 70 to 99.9% by weight of a monomer from the group consisting of styrene, α-methylstyrene and styrene alkylated in the nucleus or a mixture of these monomers,
   ($b_2$) from 0.1 to 30% by weight of one or more compounds from the group consisting of tert-butyl acrylate and tert-butyl methacrylate, and
   ($b_3$) from 0 to 10% by weight, based on the copolymer, of a further ethylenically unsaturated monomer which is copolymerizable with $b_1$ and $b_2$, and
   (C) from 5 to 50 parts by weight of an inorganic reinforcing agent, the number of parts by weight being based on 100 parts by weight of the sum of A, B and C.

2. A thermoplastic molding material as claimed in claim 1, containing, as essential components,
   from 50 to 88 parts by weight of A,
   from 2 to 10 parts by weight of B and
   from 10 to 48 parts by weight of C.

3. A thermoplastic molding material as claimed in claim 1, wherein $b_2$ is tert-butyl acrylate or tert-butyl methacrylate or a mixture of these.

4. A thermoplastic molding material as claimed in claim 1, wherein $b_2$ is a compound of the formula I or a compound of the formula II or a mixture of these.

5. A thermoplastic molding material as claimed in claim 4, wherein $b_2$ is vinyltrimethoxysilane or γ-methacryloyloxypropyltris-(2-methoxyethoxy)-silane or a mixture of these.

6. A process for the preparation of a thermoplastic molding material as claimed in claim 1 by mixing the components A, B and C at from 200° to 320° C. in an extruder, wherein glass rovings C are impregnated with an aqueous dispersion of B, fed into an orifice of an extruder and mixed with the molten component A in the extruder, while the water of the dispersion of B is removed.

7. A reinforced thermoplastic molding material containing, as essential components,
(A) from 40 to 94 parts by weight of a polymer component of
   ($a_1$) from 10 to 90% by weight of polyphenylene ether and
   ($a_2$) from 10 to 90% by weight, based in each case on A, of a styrene polymer toughened with an unhydrogenated or hydrogenated polymer of a conjugated diene,
(B) from 1 to 20 parts by weight of a copolymer of
   ($b_1$) from 70 to 99.9% by weight of a monomer from the group consisting of styrene, α-methylstyrene and styrene alkylated in the nucleus or a mixture of these monomers,
   ($b_2$) from 0.1 to 30% by weight of one or more compounds from the group consisting of tert-butyl acrylate and tert-butyl methacrylate, or one or more compounds from the group of compounds of the general formula I

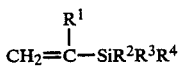

where $R^1$ is hydrogen or methyl and $R^2$, $R^3$ and $R^4$ are each an alkyl or alkoxy group of not more than 4 carbon atoms, or of the general formula II

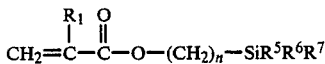

where n is an integer of from 1 to 4 and $R^5$, and $R^6$ and $R^7$ are each one of the radicals stated for $R^2$ or are each $-O+CH_2-CH_2)_mR^8$, where $R^8$ is $C_1$-$C_4$-alkyl and m is 1, 2, 3 or 4, and
   ($b_3$) from 0 to 10% by weight, based on the copolymer, of a further ethylenically unsaturated monomer which is copolymerizable with $b_1$ and $b_2$ and
(C) from 5 to 50 parts by weight of an inorganic reinforcing agent, the number of parts by weight being based on 100 parts by weight of the sum of A, B and C.

8. A reinforced thermoplastic molding material containing, as essential components,
(A) from 40 to 94 parts by weight of a polymer component of
   ($a_1$) from 10 to 90% by weight of polyphenylene ether and
   ($a_2$) from 10 to 90% by weight, based in each case on A, of a sytrene polymer toughened with an unhydrogenated or hydrogenated polymer of a conjugated diene,
(B) from 1 to 20 parts by weight of a copolymer of
   ($b_1$) from 70 to 99.9% by weight of a monomer from the group consisting of styrene α-methylstyrene and styrene alkylated in the nucleus or a mixture of these monomers,
   ($b_2$) from 0.1 to 30% by weight of one or more compounds from the group of compounds of the general formula I

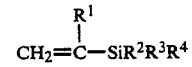

where $R^1$ is hydrogen or methyl and $R^2$, $R^3$ and $R^4$ are each an alkyl or alkoxy group of not more than 4 carbon atoms, or of the general formula II

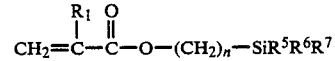

where n is an integer of from 1 to 4 and $R^5$, $R^6$ and $R^7$ are each one of the radicals stated for $R^2$ or each are $-O+CH_2-CH_2-O)_mR^8$, where $R^8$ is $C_1$-$C_4$-alkyl and m is 1, 2, 3 or 4, and
   ($b_3$) from 0 to 10% by weight, based on the copolymer, of a further ethylenically unsaturated monomer which is copolymerizable with $b_1$ and $b_2$, and
(C) from 5 to 50 parts by weight of an inorganic reinforcing agent, the number of parts by weight being based on 100 parts by weight of the sum of A, B and C.

9. A reinforced thermoplastic molding material containing, as essential components:
(A) from 40 to 94 parts by weight of a polymer component of
   ($a_1$) from 10 to 90% by weight of polyphenylene ether and
   ($a_2$) from 10 to 90% by weight, based in each case on A, of a styrene polymer toughened with an acrylate rubber or with an unhydrogenated or hydrogenated polymer of a conjugated diene,
with the proviso that the acrylate rubber differs from component (B) in having a glass transition temperature below 0° C.,
(B) from 1 to 20 parts by weight of a copolymer of
   ($b_1$) from 70 to 99.9% by weight of a monomer from the group consisting of styrene, α-methylstyrene and styrene alkylated in the nucleus or a mixture of these monomers,
   ($b_2$) from 0.1 to 30% by weight of one or more compounds from the group consisting of tert-butyl acrylate and tert-butyl methacrylate, or one or more compounds from the group of compounds of the general formula I

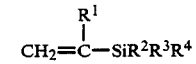

where $R^1$ is hydrogen or methyl and $R^2$, $R^3$ and $R^4$ are each an alkyl or alkoxy group of not more than 4 carbon atoms, or of the general formula II

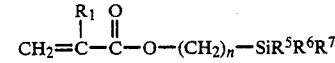

where n is an integer from 1 to 4 and $R^5$, $R^6$ and $R^7$ are each one of the radicals stated for $R^2$ or are each $-O+CH_2-CH_2-O)_mR^8$, where $R^8$ is $C_1$-$C_4$-alkyl and m is 1, 2, 3 or 4, and
   ($b_3$) from 0 to 10% by weight, based on the copolymer, of a further ethylenically unsaturated monomer which is copolymerizable with $b_1$ and $b_2$, and
(C) from 5 to 50 parts by weight of an inorganic reinforcing agent,
the number of parts by weight being based on 100 parts by weight of the sum A, B and C.

10. A molded article produced from the reinforced thermoplastic molding material as claimed in claim 9.

* * * * *